(No Model.)

F. MILLER.
MILK COOLER.

No. 506,057. Patented Oct. 3, 1893.

Witnesses
A. D. Robbie
M. Dougherty

Inventor
Frank Miller
By Thos. S. Sprague & Son,
Attys.

UNITED STATES PATENT OFFICE.

FRANK MILLER, OF BELLEVILLE, MICHIGAN.

MILK-COOLER.

SPECIFICATION forming part of Letters Patent No. 506,057, dated October 3, 1893.

Application filed May 23, 1893. Serial No. 475,241. (No model.)

*To all whom it may concern:*

Be it known that I, FRANK MILLER, a citizen of the United States, residing at Belleville, in the county of Wayne and State of Michigan, have invented certain new and useful Improvements in Milk-Coolers, of which the following is a specification, reference being had therein to the accompanying drawings.

This invention consists in the peculiar construction of a cooling can having a tortuous channel for the milk, and a water or ice tank arranged so that the ice is kept in contact with said channel at all times.

The invention further consists in the peculiar construction, arrangement and combination of the various parts, all as more fully hereinafter described.

Figure 1:
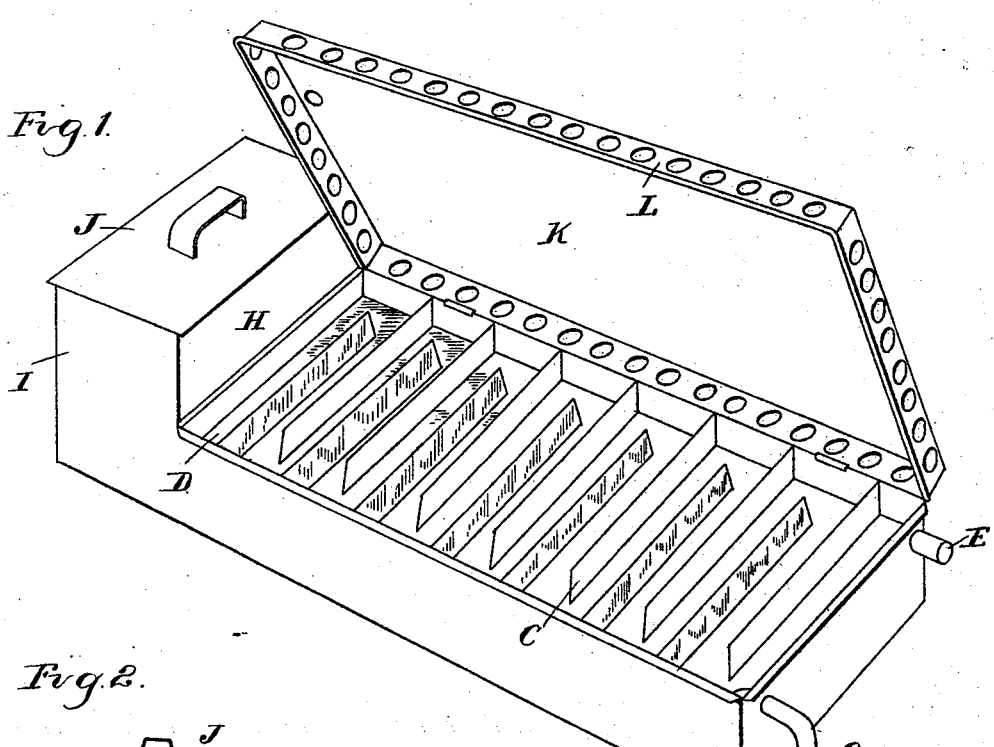
Figure 2:
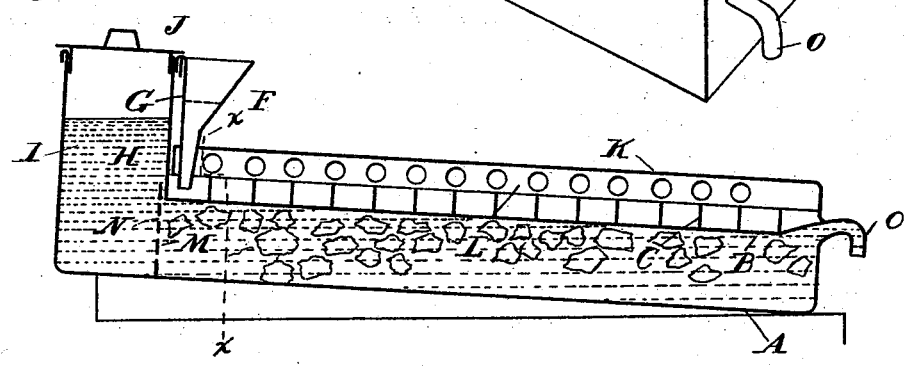
Figure 3:
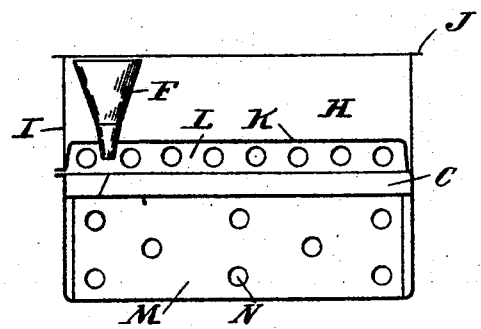

In the drawings, Figure 1 is a perspective view of my improved device. Fig. 2 is a vertical, longitudinal section thereof. Fig. 3 is a cross section on line X X in Fig. 2.

A is a tank. B is the top thereof which is arranged below the top edges of the tank and C are flanges on the top B extending from one side of the tank to near the other, so as to form a tortuous channel D from one end to the other of the tank, as plainly shown in Fig. 1.

E is the exit pipe for the milk which may be poured at the opposite end, in any suitable manner. I preferably pour it through the funnel F which has a rear flat face G.

K is a cover for the countersunk portion of the main tank hinged to the upper edge of the tank and having a perforated flange L forming escape passages for the vapors rising from the milk.

K' is an aperture in the cover K through which the funnel passes.

I is a vertical extension at one end of the main tank A, extending above the same and is provided with a cover J.

M is a gate sliding in guide ways M' provided with apertures N controlling the passage between the tanks I and A as plainly shown in Fig. 3.

O is the exit pipe for the tank which is carried up to a height at least equal to the upper edge of the tank.

The parts being thus constructed they are intended to operate as follows:—The cover being closed, the funnel in position, the operator first fills the tanks I and A with ice, placing the gate M in position, so that the ice in the tank A cannot escape and then allow the milk to flow from its receptacle through the funnel F and into the tortuous channel D, through which it will slowly flow passing from side to side of the tank and finally find exit through the pipe E, thoroughly cooled and free from the animal heat. As the ice in the tank A melts the water therefrom will hold such ice as remains tightly against the top B, so that so long as there is any ice in the tank at all it will be pressed against the bottom of the passage way through which the milk has traveled. This is accomplished by having the tank I and the outlet O from the tank at a point higher than the top B of the tank A. When ice is not used and simply a flow of cold water is had through the tank, hydrostatic pressure will insure close contact of the water on the top B. My device however is especially intended to be used with ice.

What I claim as my invention is—

1. In a milk cooler, the combination of the tank A, having the countersunk top B and flanges C extending oppositely from one side to the other, the cover K having the apertured flange L, the funnel F passing through the cover at one end, and the exit pipe E at the other end, substantially as described.

2. In a milk cooler, the combination of the tank A, the countersunk top B, having the tortuous channel formed on said top within the extension, the elevated tank I at one end of the tank A, the apertured gate M controlling communication between the extension and the exit pipe O extending above the top B of the tank, substantially as described.

3. In a milk cooler, the combination with a tank having a countersunk top, and ice and water receptacle beneath the top, a vertical extension at the end of the tank extending above the top, a gate having openings therein between the extension and tank and an exit pipe at the end of the tank opposite the extension, substantially as described.

In testimony whereof I affix my signature in presence of two witnesses.

FRANK MILLER.

Witnesses:
M. B. O'DOGHERTY,
A. L. HOBBIE.